US009507434B2

(12) United States Patent
Bruno et al.

(10) Patent No.: US 9,507,434 B2
(45) Date of Patent: Nov. 29, 2016

(54) MODULAR MODIFIABLE COMPUTER KEYBOARD

(71) Applicants: Philip J. Bruno, Oakland, CA (US); Robert A. D. Schwartz, Oakland, CA (US); Paul Schwartz, Oakland, CA (US)

(72) Inventors: Philip J. Bruno, Oakland, CA (US); Robert A. D. Schwartz, Oakland, CA (US); Paul Schwartz, Oakland, CA (US)

( * ) Notice: Subject to any disclaimer, the term of this patent is extended or adjusted under 35 U.S.C. 154(b) by 578 days.

(21) Appl. No.: 13/652,732

(22) Filed: Oct. 16, 2012

(65) Prior Publication Data

US 2014/0104173 A1   Apr. 17, 2014

(51) Int. Cl.
*G06F 3/02* (2006.01)
*G09G 5/00* (2006.01)
*G06F 21/83* (2013.01)

(52) U.S. Cl.
CPC .............. *G06F 3/0202* (2013.01); *G06F 21/83* (2013.01)

(58) Field of Classification Search
CPC ........................................................ G06F 3/02
USPC .......................................................... 345/168
See application file for complete search history.

(56) References Cited

U.S. PATENT DOCUMENTS

| 5,654,701 | A | 8/1997 | Liao et al. | |
|---|---|---|---|---|
| 5,809,143 | A | 9/1998 | Hughes | |
| 5,865,546 | A * | 2/1999 | Ganthier et al. | 400/489 |
| 6,282,655 | B1 * | 8/2001 | Given | 726/34 |
| 6,727,890 | B2 | 4/2004 | Andres et al. | |
| 7,209,123 | B2 | 4/2007 | Andres et al. | |
| 8,074,884 | B2 | 12/2011 | Gerhard | |
| 2002/0172001 | A1 * | 11/2002 | Homer et al. | 361/683 |
| 2004/0000048 | A1 | 1/2004 | Wu | |
| 2004/0051698 | A1 * | 3/2004 | Andres et al. | 345/168 |
| 2006/0250367 | A1 * | 11/2006 | Tabasso et al. | 345/168 |
| 2008/0259551 | A1 * | 10/2008 | Gavenda et al. | 361/684 |
| 2011/0185408 | A1 * | 7/2011 | Travis | 726/6 |
| 2013/0169541 | A1 * | 7/2013 | Cabos et al. | 345/168 |

* cited by examiner

*Primary Examiner* — Nicholas Lee
(74) *Attorney, Agent, or Firm* — Howard Cohen

(57) ABSTRACT

A computer keyboard is designed to accommodate a variety of security features that may be installed in the keyboard during manufacturing, whereby various combinations of devices that impart selected security features or other functions may be assembled. The keyboard assembly includes a base extension for accommodating the security devices, and a number of interchangeable modular tops supporting various discreet input technologies. This modular design is tooled to accommodate different combinations of technologies, such as biometric fingerprint readers, NFC-RFID receivers, auto locking sonar, game cartridges, and connector-supporting modules. Each interchangeable modular top can hold independent modular technology that can be used to construct an integrated device that meets the customer requirements without any substantial modification of the keyboard base or extension.

13 Claims, 3 Drawing Sheets

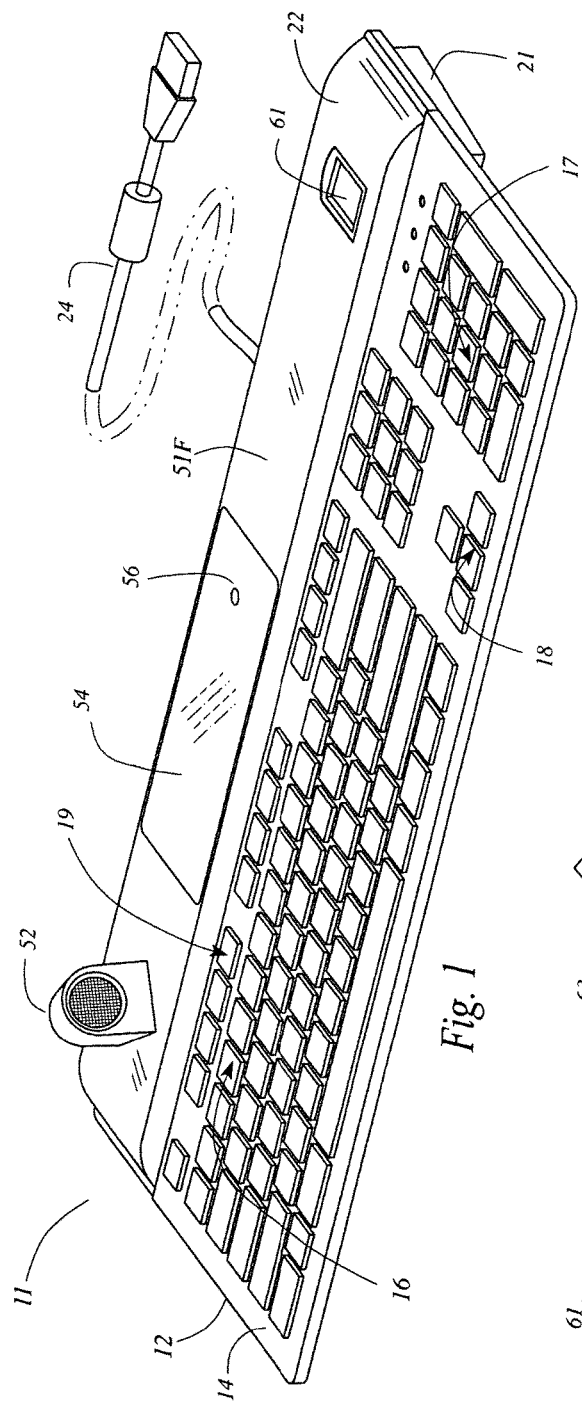
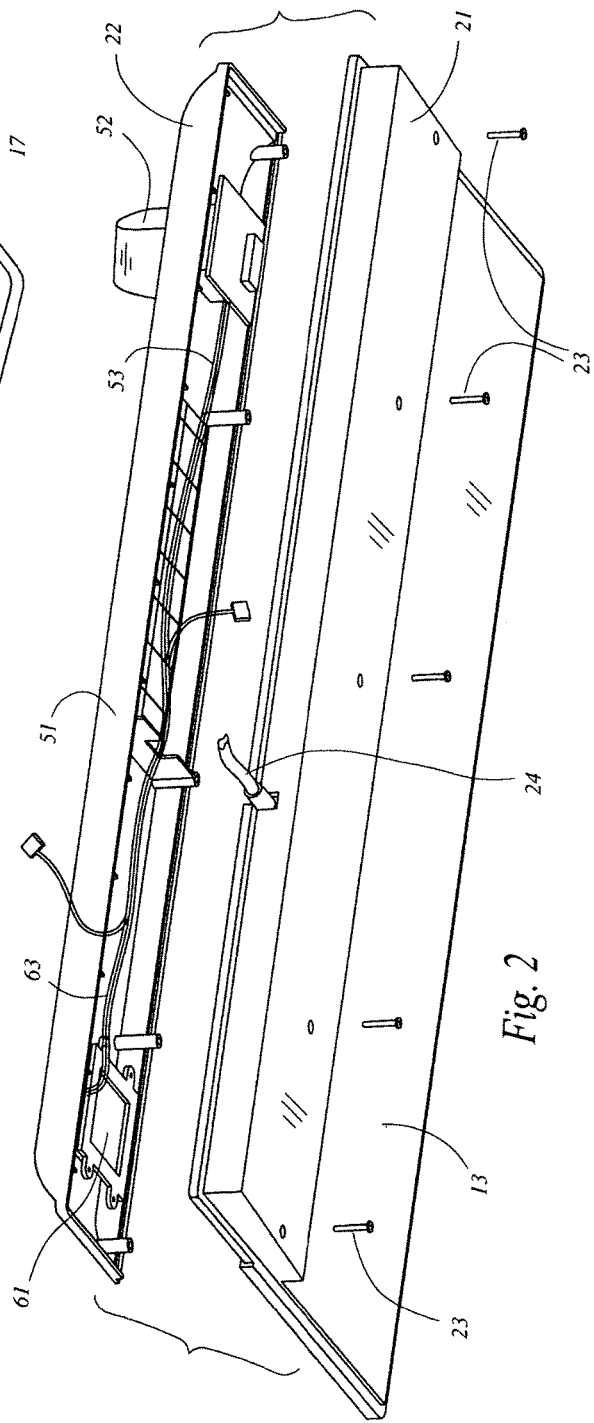
Fig. 1
Fig. 2

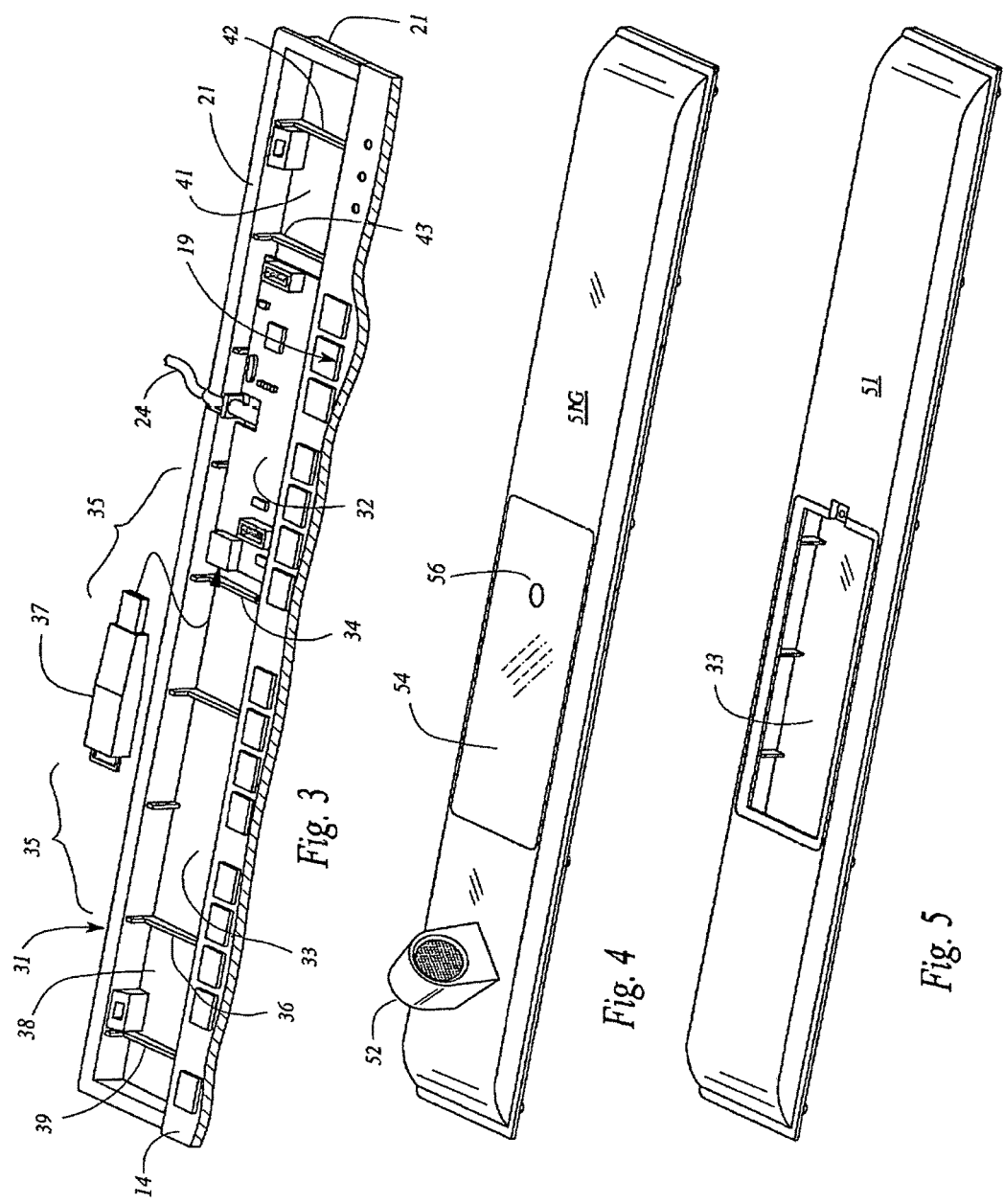

MODULAR MODIFIABLE COMPUTER KEYBOARD

CROSS-REFERENCE TO RELATED APPLICATIONS

This application claims the benefit of filing date priority based on U.S. application Ser. No. 13/136,358, filed Jul. 28, 2011, which claims filing date priority based on Provision Application No. 61/369,301, filed Jul. 30, 2010.

FEDERALLY SPONSORED RESEARCH

Not applicable.

SEQUENCE LISTING, ETC ON CD

Not applicable.

BACKGROUND OF THE INVENTION

1. Field of the Invention

This invention relates to a keyboard for use with a computer system, particularly a computer system that requires secure log-in arrangements and the ongoing presence of the logged-in individual at the keyboard.

2. Description of Related Art

As computer systems have become more and more essential to the operation of businesses and institutions, there has been a concomitant increase in the number of terminals, work stations, desktop computers and the like that are connected to the computer system that serves the business or institution. One of the many uses of a central computer system is the storage of records that should be held confidential, such as medical data regarding individuals, personnel records, financial records and transactions of the business or institution, payroll records, and the like. For this and other reasons there is a definite need for some form of security system to limit access to confidential information, not to mention access to computerized functions such as payroll, billing, and the like. On the other hand, it is necessary to grant access of some sort to a large number of individuals so that they may carry out their assigned tasks which often involve interaction with the computer system. The confluence of the requirement for confidentiality and the need to grant access has lead to a proliferation of security measures and systems that are designed to recognize individuals who are authorized to have access to the computer system and at least some portion of its records and functions, while denying access to those individuals who endeavor to gain access to the system without authorization.

The most common security devices and measures currently in use include passwords assigned individually to each employee, biometric sensors such as fingerprint readers, iris scanners, facial recognition, and the like, electronic scanners such as RFID or NFC-RFID for security cards or badges, and auto locking sonar transceivers to detect whenever an authorized individual leaves the vicinity of the computer or terminal where authorized access took place. See for example the description of an auto locking sonar system in U.S. application Ser. No. 13/136,358, filed Jul. 28, 2011, which is incorporated by reference herein in its entirety.

It may be appreciated that security requirements for computer systems may vary widely, depending on the nature of the business or activity and the sensitivity of the data stored in the computer system. System integrators who design the computer scheme for a business or institution generally must select discrete devices that perform the requisite security functions, and must connect them at each terminal or workstation, often with a proliferation of cables and connectors. These devices are provided in addition to the computer keyboard and monitor, and often a printer and/or scanner. The number of hardware items included in a single terminal or workstation may comprise a logistical and wiring challenge.

And more generally, a terminal or workstation may be required to be equipped with some other forms of functionality such as a USB connector port or iPod™ or smart phone connector or a game cartridge connector, or similar modular functional components. Typically these functions are embodied in modules that are connected to the terminal or workstation via cables, as with the security modules noted above.

BRIEF SUMMARY OF THE INVENTION

The present invention generally comprises a computer keyboard for use with a terminal or workstation or desktop computer setup. A salient feature of the keyboard is that it is designed to accommodate a variety of security features that may be installed in the keyboard during manufacturing, whereby various combinations of devices that impart selected security features may be assembled. The resulting keyboard integrates a plurality of security devices into one keyboard construction, reducing the proliferation of desktop devices surrounding the keyboard and monitor, and simplifying the wiring of the system.

In one aspect the invention provides a keyboard assembly having a unique modular system, designed to have flexible interchangeable tops to accommodate various discreet input technologies. This modular design is tooled to accommodate up to seven different combinations of technologies; presently there are three types of biometric fingerprint readers, NFC-RFID receivers and auto locking sonar. Each interchangeable modular top can hold independent input technology that can be used to construct an integrated device that meets the customer's requirements.

The interchangeable modular top, once fitted with the selected input technology and connected electronically via an internal USB hub, can be assembled into the final product during manufacturing with five screws. Conversely the keyboard can be upgraded or modified at a later date if returned to the factory or serviced by a qualified technician.

Adding to the versatility of this keyboard design is an integrated "utility well" specifically designed to allow for field changes and upgrades of the NFC/RFID technology. The well extends under a portion of the interchangeable modular top, and is secured by a proprietary locking screw or the like and a clear plastic cover. A decorative branded label is placed over the clear plastic cover to designate the internal technology and a opening to show a functional LED indicator. The basic design concept allows the keyboard to be customized with the latest technologies without total redesign and at a very low cost. That is, an authorized technician may open the plastic cover, extract and replace the module therein, and restore the cover. Thus the system may be upgraded with the latest technological developments without requiring replacement of the entire keyboard. Indeed, no part of the keyboard may need replacement, except for the modular component received and connected in the utility well.

The interchangeable modular tops provided by the invention may be used to provide a wide range of new functionality to the terminal or workstation. For example, the modular tops may support features such as USB connector(s), iPod or smart phone connectors, game cartridge connectors, proprietary connectors, or the like. Likewise, these functional components may be placed in the utility well and connected therein to a USB port, with a well cover that is appropriate for the purpose.

BRIEF DESCRIPTION OF THE DRAWING

FIG. 1 is a perspective view depicting the computer keyboard assembly of the invention, showing the provision of three separate security modules in the assembly.

FIG. 2 is an exploded bottom perspective view showing the assembly of the interchangeable top cover to the base of the keyboard assembly.

FIG. 3 is an enlarged partially sectioned perspective view of the base extension housing selectively chosen security devices.

FIG. 4 is a perspective view of the interchangeable modular top of the base extension, incorporating a sonar auto-locking system and an RFID device.

FIG. 5 is a perspective view of an interchangeable modular top of the base extension, showing a receptacle or well for receiving and connecting a security device such as an RFID or NFC-RFID unit.

DETAILED DESCRIPTION OF THE INVENTION

Figure 6A:
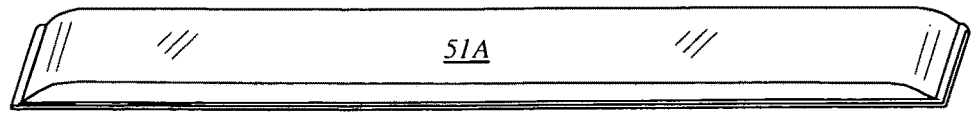
FIGS. 6A-6E are perspective views of the interchangeable top of the base extension, depicting various other combinations of security devices that may be incorporated in the keyboard assembly.

The present invention generally comprises a computer keyboard that it is designed to accommodate a variety of security features that may be installed in the keyboard during its manufacture, whereby various combinations of devices that impart selected security features may be assembled to form a single, integrated keyboard unit. With regard to FIG. 1, the keyboard assembly 11 is comprised of a base assembly 12 having a generally rectangular shape extending laterally and having a bottom surface 13 (FIG. 2) designed to rest on a horizontal surface such as a desk or table. The top surface 14 of the base assembly 12 includes an array of keys presented in a standard format, such as the Qwerty layout 16 shown in the figure. Adjacent to the qwerty layout 16 is a numeric keypad 17, as well as directional navigation arrow keys 18. The layout of keys shown herein is for example only: many such layouts are well known in the prior art, and the key layout forms no independent part of this invention.

At the top (distalmost from the keyboard user) of the key layouts is a row of function keys 19 for accessing computer functions directly, as is known in the prior art. Adjacent to the function key row 19 is a base extension 21 of the keyboard base assembly 12 extending laterally the width of the keyboard assembly and distally from the user in a generally flat rectangular configuration. A cover 22 may be secured to the base extension 21 to form a smooth contiguous surface with the keyboard portion of the assembly. The base extension 21 is assemblable to the base 12 of the assembly or formed therewith to define a single integrated assembly. The cover 22 is secured to the base extension 21 by a plurality of screws 23 or the like received in appropriately tapped holes in the cover 22. The screws may be non-removable or be installed with thread-locking compound to prevent disassembly by unauthorized persons.

A significant feature of the invention is the ability of the keyboard assembly 11 to incorporate various selected security devices to enable the keyboard assembly to be used only by authorized individuals. Typically the keyboard is connected to a computer system via a cable 24, along with a computer monitor screen and other ancillary devices that may form a computer work site, workstation, desktop computer or the like installation (hereinafter, workstation). The security devices of the keyboard assembly may be chosen to suit the installation situation, and are typically connected to prevent login to the computer system without proper authorization, and to log out of the computer system whenever an authorized user has moved away from the workstation, so that an unauthorized person may not assume the place of an authorized individual and gain access to the computer system.

As shown in FIG. 3, the base extension 21 is configured as a shallow, upwardly opening coffer 31 having defined bays that carry out separate and distinct functions. Bay 32 is intended to house a printed circuit board and other electronic components that enable communications between the keyboard assembly 11 and the computer system through the cable 24. Thus all of the signaling for keys 17-19 is connected directly through cable 24 to the workstation, and does not require any additional modular components. Adjacent to bay 32 there is a utility well 33 defined between reinforcing bulkheads 34 and 36. The utility well is dimensioned to be receptive to any one of a number of standard security sensor modules known in the prior art, such as RFID, NFC-RFID, and other electromagnetic or RF identity card or badge readers. The well 33 is also provided with a standard USB 2.0 or 3.0 or equivalent connector 37 so that any security sensor module 35 placed in the well 33 may be connected to provide power as well as data transmission through the keyboard and thus through the cable 24 to the computer system. In addition, another bay 38 is defined between reinforcing bulkheads 36 and 39, and a further bay 41 is defined between reinforcing bulkheads 42 and 43, which forms one end of bay 32.

It may be appreciated that the utility well 33 and bays 38 and 41 may be provided with selected security sensor modules during the manufacture of the keyboard. A plurality of interchangeable covers 51 are also provided, each having a rectangular plan layout that fits in complementary fashion over the coffer opening 32 to enclose and seal the opening. Furthermore, the interchangeable covers 51 are provided with features that either embody portions of the security sensor modules, or accommodate modules placed in the bays, or enable communications to the module(s) placed in the bay(s).

For example, one very useful device for preventing unauthorized use of a workstation is a modular sonar auto-lock device 52, which uses inaudible ultrasonic sound waves to detect the presence of a user in the immediate vicinity of the keyboard 11. For a description of an auto locking sonar system incorporated in a keyboard, see U.S. application Ser. No. 13/136,358, filed Jul. 28, 2011, which is incorporated by reference herein in its entirety. The modular sonar auto-lock device 52 extends upwardly and fixedly from the cover 51 adjacent to one end thereof and in registration with the bay 38 in the base extension 21. The bay 38 provides clearance for any depending portion of the module 52 and also facilitates connection of the module 52 to the keyboard communications electronics in bay 32 via wires 53 (FIG. 2). The module 52 projects a cone of sonic energy toward the position of a user of the keyboard; after the individual has logged in to the computer system, the sonar system continuously detects the presence of the user. If the user departs the vicinity of the keyboard, creating an "open window" into the computer system, the device 52 will detect the user's absence immediately and will signal the system to freeze the screen of the associated monitor, log out of the computer system, and protect the system from inadvertent or intentional snooping.

The utility well 33 may remain empty, or may be used to secure any one of a number of standard security sensor modules known in the prior art, such as RFID, NFC-RFID, and other electromagnetic or RF identity card or badge readers. The selected module is connected to the system through internal USB connector 37, and is used by the computer system to verify the identity of an individual seeking authorization to use the workstation by scanning an identity card or badge, with or without requiring an alphanumeric security code from the individual. There are different manufacturing sources for the standard security sensor module, but their size, range, and power requirements are generally made similar by international standards. A translucent cover plate 54 is secured to the cover 51 over the opening of the utility well 33, and an LED indicator light 56 is connected to illuminate the cover plate 54 when the security sensor module in well 33 is operating. The cover plate translucency enables the user to know that an active security sensor is attached and connected within the keyboard, and that it is operating. However, the module is not visible and cannot be identified. Generally the card or badge needs to be brought into proximity to the RFID sensor module, though some devices can read a card or badge within a range of several feet.

Another significant security device that may be incorporated into the keyboard assembly is a biometric sensor module 61, secured fixedly in the cover 51 and disposed in registration with the bay 41 of the base extension 21. The bay 41 provides clearance for any depending portion of the module 61 and also facilitates connection of the module 61 to the keyboard communications electronics in bay 32 via wires 63 (FIG. 2). The biometric sensor module 61 may comprise a fingerprint scanner, a retinal scanner, a facial recognition imaging device, or the like. Whatever the biometric technique carried out by the module 61, it recognizes an authorized individual by detecting a physical feature that is unique to that person. Thus it established in personam identification of the individual, whereas the RFID approach is limited to establishing the identity of an authorized card in the possession of the user.

A salient aspect of the invention is that the base extension provides the opportunity to select any combination of the three classes of security sensor modules that are supported and secured in the bays and the utility well 33. In order to accommodate the different possible combinations of security modules, the invention provides a plurality of interchangeable modular covers 51 that are shaped and formed to incorporate one or more of the discrete input devices that have been described above, or none at all. For example, FIG. 6A depicts a cover 51A that bears no facility for any of the security devices discussed above, so that it is used when the keyboard 11 is to be manufactured without including any security features whatsoever.

Figure 6B:
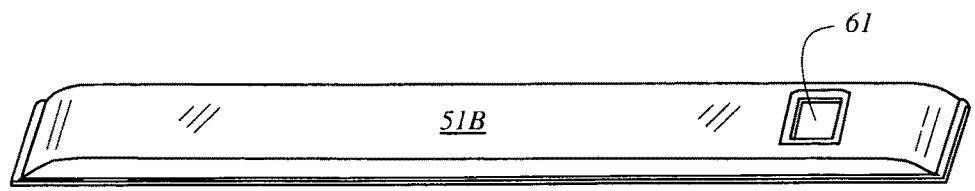
Figure 6C:
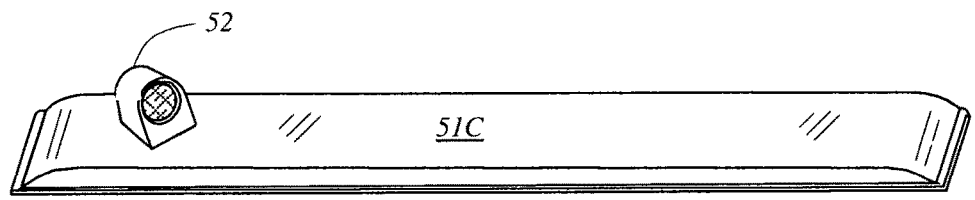
Figure 6D:
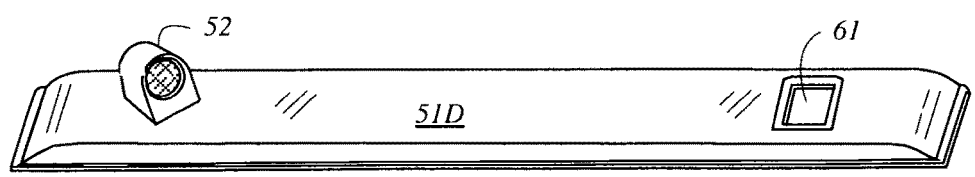
Figure 6E:
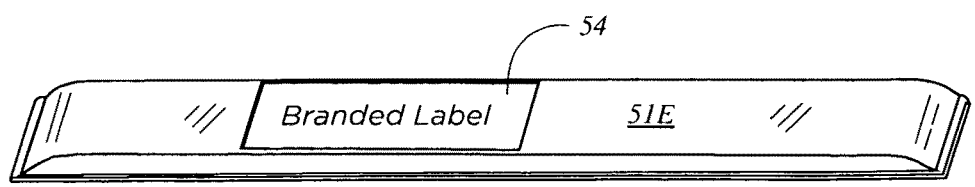

As shown in FIG. 6B, cover 51B is identical to cover 51A except for the inclusion of the biometric sensor module 61 in the upper surface of the cover and connected as described above to the keyboard and thence by cable 24 to the computer system. This cover 51B is chosen to be used when a consumer desires a keyboard 11 that provides only the biometric sensor 61 to verify the user of the system. Likewise, cover 51C (FIG. 6C) provides the modular sonar auto-lock device 52 to the keyboard assembly, and no other security device. In FIG. 6D the cover 51D is shown to provide both the modular sonar auto-lock device 52 and the biometric sensor 61 for systems that are engineered to require biometric ID and continued presence of the user after authorization to use the workstation. And in FIG. 6E the cover 51E provides support only for the utility well-mounted device, such as an RFID or NFC-RFID module. The cover plate 54 of the well 33 may be provided with a branded label identifying the vendor that provided the system, so users may know which security card or badge must be presented.

Note that the cover 51F of FIG. 1 serves to provide all three security devices: the modular sonar auto-lock device 52, the biometric sensor module 61, and an RFID device in utility well 33. Likewise, the cover 51G of FIG. 4 presents both the modular sonar auto-lock device 52 and some form of RFID module in well 33, without the use of a biometric sensor module.

Thus the keyboard system of the invention is adaptable to provide the type of security devices required by an existing computer system or incorporated into a newly designed computer system. The keyboard base assembly 12 with its base extension 21 may host a wide variety of security modules from a wide range of vendors, without necessitating any changes in the fundamental construction of the apparatus. The differing covers enable the quick and effective inclusion of the requisite security modules with a minimum of extra manufacturing expense, so that costs are held down while manufacturing flexibility is optimized.

A further salient aspect of the invention is that the modular connectivity of the keyboard may be employed to incorporate a broad range of electronic devices and digital functionality in the workstation. The interchangeable covers 51 may incorporate features such as an external USB port or iPod™ connector or other smart phone connector. Likewise, non-security modular components such as game cartridges, graphics or other processors and the like may be added to the workstation via the keyboard. In this regard, note that the entire keyboard assembly is essentially unchanged: it is necessary only to create a cover 51 that incorporates the desired modules, connect the modules in the respective bays, and secure the cover over the coffer. Likewise, a broad range of devices may be placed and connected in the utility well 33, such as any enumerated above.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a computer keyboard having a base that displays a plurality of keys that enable alphanumeric input to a computer system, the improvement comprising:
   a base extension comprising a projection extending integrally from said base and laterally adjacent a laterally extending edge of said base, said base extension including an upwardly opening shallow coffer;
a plurality of security sensor modules;
said upwardly opening coffer including a plurality of bays, each disposed to accommodate and operate at least one of said security sensor modules;
a plurality of modular interchangeable covers dimensioned to be received on said base extension to enclose said shallow coffer, each of said covers supporting at least one security sensor module;
each interchangeable cover being permanently secured to said base extension and dimensioned to enclose said shallow coffer and said plurality of bays and protect said at least one security sensor module; and,
means for connecting said at least one security sensor module to said computer system to control access to said computer system through the computer keyboard.

2. The computer keyboard of claim 1, wherein said at least one bay comprises a utility well dimensioned to receive and secure said at least one security sensor module, said means for connecting including a wired connection from said at least one security sensor module through the computer keyboard to said computer system.

3. The computer keyboard of claim 2, wherein said means for connecting includes a USB plug connector located in said utility well for connection to said at least one security sensor module.

4. The computer keyboard of claim 2, wherein said at least one security sensor module comprises an RFID device for reading a security card or badge.

5. The computer keyboard of claim 2, wherein said plurality of modular interchangeable covers includes a first cover having an opening therethrough in alignment with said utility well, and further including a plate dimensioned to seal said opening, said first cover enclosing said upwardly opening coffer of said base extension and presenting said at least one security sensor module in an operational orientation in said utility well.

6. In a computer keyboard having a base that displays a plurality of keys that enable alphanumeric input to a computer system, the improvement comprising:
a base extension comprising a projection extending from said base and including an upwardly opening shallow coffer;
a plurality of modular interchangeable covers dimensioned to be received on said base extension to enclose said shallow coffer, each of said covers supporting at least one security sensor module; and,
means for connecting said at least one security sensor module to said computer system to control access to said computer system through the computer keyboard;
wherein said plurality of modular interchangeable covers includes a first cover having a sonar auto-locking security module extending upwardly from the outer surface thereof, said first cover secured permanently to said base extension of said keyboard and enclosing said upwardly opening coffer of said base extension with said sonar auto-locking security module directed to aim a beam of ultrasonic energy over said plurality of keys toward an expected position of a keyboard user, whereby the presence of said keyboard user may be detected.

7. The computer keyboard of claim 6, further including a at least one bay in said coffer disposed adjacent to a utility well, said at least one bay disposed subjacently to said sonar auto-locking security module and including means to connect said sonar auto-locking security module through the computer keyboard to said computer system.

8. The computer keyboard of claim 7, wherein said plurality of modular interchangeable covers includes a second cover having a biometric sensor module extending upwardly from the outer surface thereof, said second cover enclosing said upwardly opening coffer of said base extension with said biometric sensor module positioned to be accessed by a keyboard user.

9. The computer keyboard of claim 8, wherein said biometric sensor module comprises a fingerprint scanner module.

10. The computer keyboard of claim 8, wherein said biometric sensor module comprises an iris scanner module.

11. The computer keyboard of claim 8, further including a second bay in said coffer disposed adjacent to a utility well, said second bay disposed subjacently to said biometric sensor module and including means to connect said biometric sensor module through the keyboard to said computer system.

12. The computer keyboard of claim 6, wherein said first cover further includes a biometric sensor module extending upwardly from said outer surface, said first cover enclosing said upwardly opening coffer of said base extension with said biometric sensor module positioned to be accessed by a keyboard user and with said sonar auto-locking security module directed to aim a beam of ultrasonic energy over said plurality of keys toward an expected position of a keyboard user, whereby the presence of said keyboard user may be detected.

13. The computer keyboard of claim 1, wherein said plurality of modular interchangeable covers includes one cover having a sonar auto-locking security module extending upwardly from the outer surface thereof, and a biometric sensor module extending upwardly from said outer surface, and a plate disposed to seal an opening in said outer surface;
a utility well located in said coffer and arranged to retain therein an RFID security module;
said one cover enclosing said upwardly opening coffer of said base extension with said opening in said cover aligned with said utility well and said plate extending adjacent to said RFID security module.

* * * * *